United States Patent
Shawgo

(10) Patent No.: US 12,071,107 B2
(45) Date of Patent: Aug. 27, 2024

(54) SYSTEMS AND METHODS FOR PROVIDING A FLOW OF AIR ABOUT A LENS OF A SENSOR OF A VEHICLE

(71) Applicant: LG INNOTEK CO., LTD., Seoul (KR)

(72) Inventor: Sean William Shawgo, Pittsburgh, PA (US)

(73) Assignee: LG INNOTEK CO., LTD., Seoul (KR)

( * ) Notice: Subject to any disclaimer, the term of this patent is extended or adjusted under 35 U.S.C. 154(b) by 422 days.

(21) Appl. No.: 16/940,598

(22) Filed: Jul. 28, 2020

(65) Prior Publication Data

US 2022/0032878 A1 Feb. 3, 2022

(51) Int. Cl.
  *B08B 5/02* (2006.01)
  *B60S 1/48* (2006.01)
  *B60S 1/54* (2006.01)
  *B60S 1/56* (2006.01)
  *G01S 17/931* (2020.01)

(52) U.S. Cl.
  CPC .............. *B60S 1/56* (2013.01); *B08B 5/02* (2013.01); *B60S 1/48* (2013.01); *B60S 1/54* (2013.01); *G01S 17/931* (2020.01)

(58) Field of Classification Search
  CPC ...... B60S 1/56; B60S 1/48; B60S 1/54; B60S 1/52; B60S 1/62; B08B 5/02; B08B 3/024; B08B 13/00; G01S 7/4043; G01S 17/931; G01S 7/4813; G01S 2007/4977; G02B 27/0006; G05D 1/0088
  See application file for complete search history.

(56) References Cited

U.S. PATENT DOCUMENTS

| | | | |
|---|---|---|---|
| 9,217,864 B2 | 12/2015 | Bell et al. | |
| 10,430,833 B2 | 10/2019 | Newman | |
| 10,520,588 B2 | 12/2019 | Paxton et al. | |
| 2004/0257556 A1 | 12/2004 | Samukawa et al. | |
| 2009/0050105 A1* | 2/2009 | Shibata ................ | F02M 35/022 123/306 |

(Continued)

FOREIGN PATENT DOCUMENTS

| | | |
|---|---|---|
| CN | 110386112 A | 10/2019 |
| DE | 102017221505 A | 6/2019 |

(Continued)

OTHER PUBLICATIONS

JP-2019112055-A Written Description (Year: 2019).*
JP2017520443A Written Description (Year: 2017).*
JPH0614887U Written Description (Year: 1994).*
International Search Report and Written Opinion of PCT/US2021/043375 mailed Nov. 19, 2021, 11 pages.

(Continued)

*Primary Examiner* — Mikhail Kornakov
*Assistant Examiner* — Emily H Yasharpour
(74) *Attorney, Agent, or Firm* — Birch, Stewart, Kolasch & Birch, LLP

(57) ABSTRACT

System and methods are disclosed herein for preventing debris accumulation and/or for removing debris about a lens of a sensor of a vehicle. The sensor may include one or more LIDAR units disposed about the vehicle. An airflow device may be disposed about the lens of the sensor. The airflow device may be configured to provide an airflow about the lens of the sensor. The airflow provided to the lens may be a constant flow of air about the lens at a low pressure and/or bursts of air about the lens at a higher pressure.

18 Claims, 12 Drawing Sheets

(56) References Cited

U.S. PATENT DOCUMENTS

| | | |
|---|---|---|
| 2016/0176384 A1 | 6/2016 | Dissette et al. |
| 2017/0036650 A1 | 2/2017 | Hester et al. |
| 2017/0320440 A1 | 11/2017 | Boegel et al. |
| 2018/0015908 A1* | 1/2018 | Rice .......................... B60S 1/56 |
| 2018/0354468 A1* | 12/2018 | Krishnan .................. B60S 1/56 |
| 2019/0008345 A1 | 1/2019 | Schmidt et al. |
| 2019/0077377 A1* | 3/2019 | Schmidt ................ B60S 1/0848 |
| 2019/0193688 A1 | 6/2019 | Lombrozo |
| 2019/0314865 A1* | 10/2019 | Sevak ................. G02B 27/0006 |
| 2019/0335572 A1 | 10/2019 | Han et al. |
| 2019/0337489 A1 | 11/2019 | Baldovino et al. |
| 2019/0351464 A1 | 11/2019 | Kim et al. |
| 2019/0359179 A1 | 11/2019 | Green et al. |
| 2020/0108801 A1 | 4/2020 | Frederick et al. |
| 2020/0216034 A1 | 7/2020 | Velasco et al. |

FOREIGN PATENT DOCUMENTS

| | | | |
|---|---|---|---|
| JP | H0614887 U | * 2/1994 | |
| JP | 2017520443 A | * 7/2017 | |
| JP | 2019112055 A | * 7/2019 | ............. B60R 11/04 |
| JP | 6564546 B1 | 8/2019 | |

OTHER PUBLICATIONS

C. Gustafsson et al. "Development of a LiDAR Cleaning System for Autonomous Trucks" in Chalmers University of Technology, Department of Industrial and Materials Science, 2019, pp. 1-118, Gothenburg, Sweden.

E. Tegler. "Bugs: A Self-Driving Car's Worst Nightmare" in Popular Mechanics, Oct. 1, 2019, Hearst Magazine Media, Inc. United States.

* cited by examiner

SYSTEMS AND METHODS FOR PROVIDING A FLOW OF AIR ABOUT A LENS OF A SENSOR OF A VEHICLE

BACKGROUND

Autonomous and partially autonomous vehicles use one or more sensors to "see" the road and surroundings. In some instances, a number of different sensors are used to facilitate the various levels of autonomy. These sensors may become obstructed by environmental debris (such as rain, dust, dirt, leaves, bugs, etc.), which may diminish and/or be detrimental to the operation and performance of the sensors. Current techniques for cleaning debris from the sensors may include spraying the sensors with water or other liquids and chemicals, which can negatively impact sensor performance. For example, the residual liquid droplets and/or chemicals on the lens of the sensors from the spray can distort or potentially interfere with the signals of the sensors.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
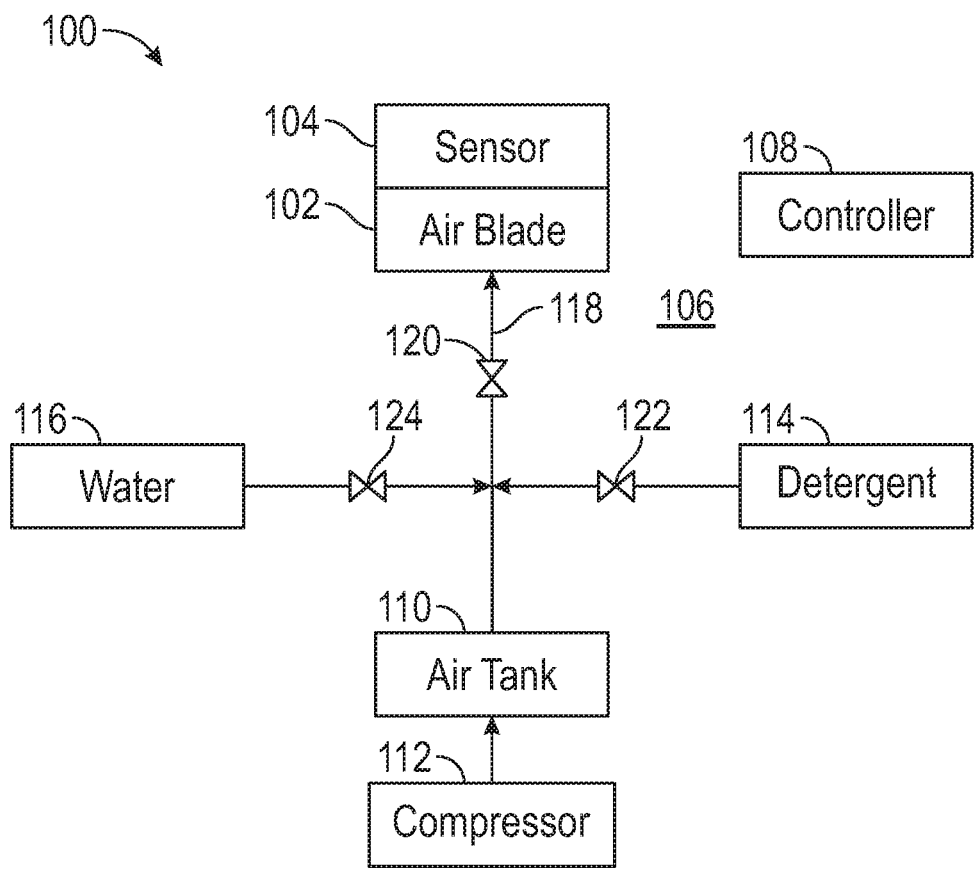
FIG. 1 schematically depicts a system in accordance with one or more embodiments of the disclosure.
Figure 2:
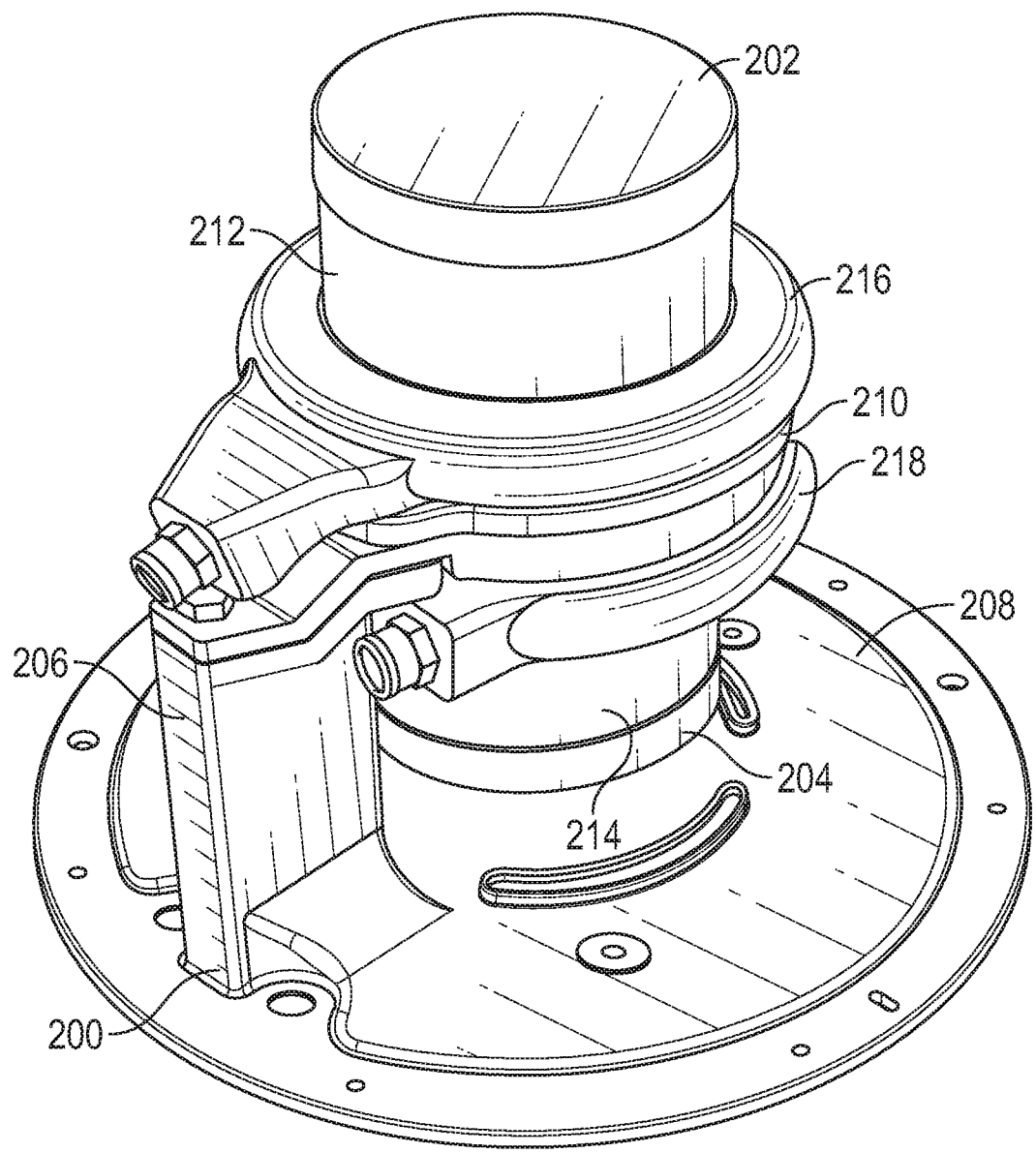
FIG. 2 schematically depicts an upper view of an airflow device in accordance with one or more embodiments of the disclosure.
Figure 3:
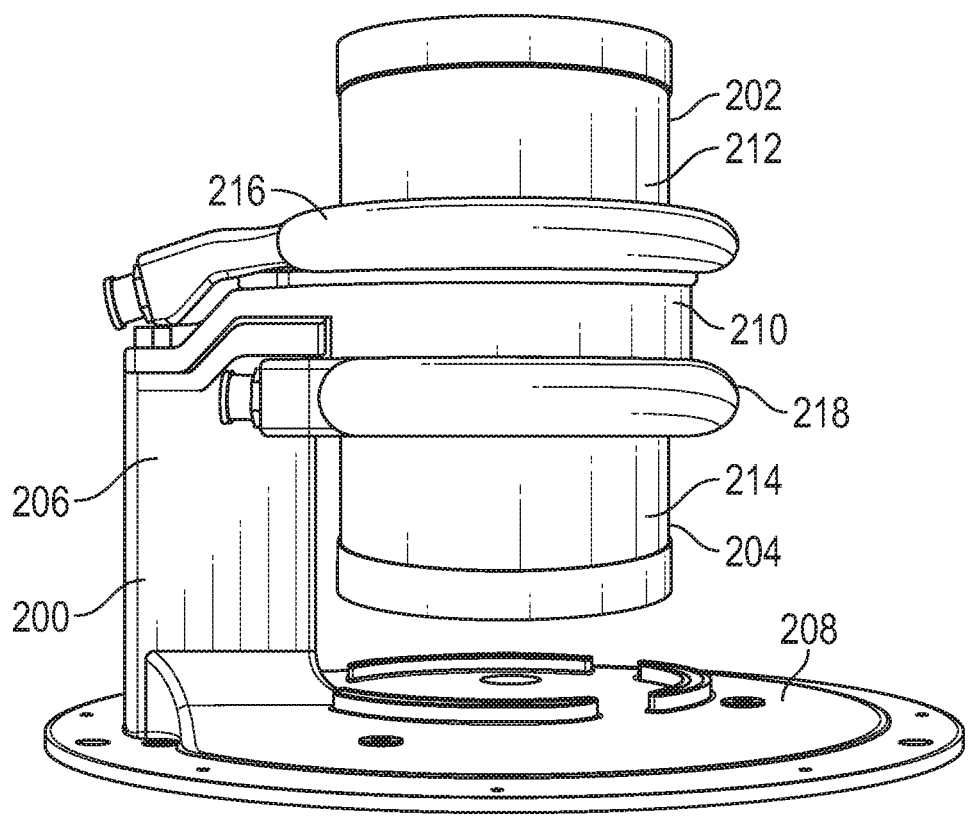
FIG. 3 schematically depicts a side view of an airflow device in accordance with one or more embodiments of the disclosure.

Autonomous vehicles and driving assistance systems are currently being developed and deployed to improve safety, reduce an amount of user input required, or even eliminate user involvement entirely. Vehicles may be configured and/or programmed to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. Finally, it is within the scope of this disclosure that the vehicle may be manually driven.

A number of different sensors are used to facilitate the various levels of autonomy discussed above. These sensors, however, may become obstructed by environmental debris (such as rain, dust, dirt, leaves, bugs, etc.), which may diminish and/or be detrimental to the operation of the sensors.

The system and methods disclosed herein are configured to prevent or substantially reduce debris accumulation and/or remove all or some of the debris about the lens of the sensors of the vehicle. In a preferred embodiment, the sensors may include one or more Light Detection and Ranging (LiDAR) units disposed about the vehicle. The systems and methods disclosed herein, however, are not limited to LiDAR units. That is, any suitable sensors for navigation may be used herein. For example, the sensors may include a number of sensors configured or programmed to generate signals that help navigate the vehicle while the vehicle is operating in one of the autonomous modes.

Examples of autonomous driving sensors may include a Radio Detection and Ranging (RADAR) sensor configured for detection and localization of objects using radio waves, a LiDAR sensor, a vision sensor system having trajectory, obstacle detection, object classification, augmented reality, and/or other capabilities, and/or the like. The autonomous driving sensors may help the vehicle "see" the roadway and the vehicle surroundings and/or negotiate various obstacles while the vehicle is operating in the autonomous modes. In this manner, the sensors may comprise RADAR sensors, LiDAR sensors, sonar sensors, audio sensors, and/or video sensors. Any suitable combination of sensors may be used herein.

In certain embodiments, one or more sensors may be disposed on top of a vehicle. For example, a LiDAR unit may be disposed on top of the vehicle as part a "tiara" structure. In some instances, the sensor may include an external 360 degree lens. The lens may be static. The lens may be any suitable size, shape, or configuration. The lens may be configured to, among other things, protect the internal components of the sensor while still providing signal visibility to the surroundings. The internal components of the sensor may be static or dynamic (e.g., rotate). If the lens of the sensor is obstructed, it may have a detrimental effect on the operation and reliability of the sensor. Thus, it is beneficial to prevent/reduce debris accumulation and/or remove debris about the lens of the sensor of the vehicle.

In some instances, the aforementioned problems may be addressed via an airflow device disposed about the lens of the sensor. The airflow device may be configured to provide an airflow about the lens of the sensor. The airflow device may be any suitable size, shape, or configuration. The airflow device may be configured to provide a flow of air that forms an "airblade" about the lens of the sensor. In some instances, the airflow provided to the lens of the sensor may be a constant flow of air about the lens at a low pressure and/or bursts of air about the lens at a higher pressure relative to the low pressure. In this manner, the constant flow of air may prevent/reduce accumulation of debris about the lens of the sensor, while the higher pressure bursts of air may remove debris about the lens of the sensor.

In certain embodiments, the airflow device may comprise a tube disposed around the sensor. The tube may be any suitable size, shape, or configuration. The tube may include an angled surface configured to substantially correspond to a field of view (FOV) of the sensor. The angled surface may be a top and/or bottom surface of the tube depending on the location of the tube relative to the lens of the sensor. In this manner, the angled surface may ensure that the tube does not interfere with the FOV of the sensor.

In an example embodiment, the tube comprises multiple segments configured to be attached together around the sensor. For example, the tube may comprise two segments that are attached together around the sensor. The tube may be any suitable number of segments. The segments may be attached by any suitable means, including press fit, detent fit, welded, glued, and/or fastened with a fastener (e.g., a screw, rivet, magnet, etc.).

In one example embodiment, the tube is configured to be attached to the sensor via one or more fasteners. The tube may be attached by any suitable means, including welded, glued, and/or fastened with a fastener (e.g., a screw, rivet, magnet, etc.). In a preferred embodiment, the tube may include one or more magnets disposed thereabout that are configured to mate with a corresponding magnet or magnetic surface of the sensor. A corresponding magnet may also be disposed on the mast for magnetically attaching the tube to the mast and around the sensor.

In certain embodiments, the tube comprises an outlet orifice directed towards the lens of the sensor. The sensor, the tube, and the outlet orifice may be substantially circular. In this manner, the airflow device uses the substantially circular outlet orifice to produce a jet of air that maintains pressure and velocity over the entire 360 degree of the lens of the sensor (e.g., the 360 degree LiDAR sensor lens) without losing effectiveness due to boundary layer separation. The airflow device is able to be incorporated onto the sensor lens without modification to the lens and is able to clean all 360 degrees of the lens.

The tube may include a baffle therein. The baffle may be configured to distribute the airflow within the tube to ensure sufficient pressure and velocity of the airflow exiting the outlet orifice to prevent debris accumulation about the lens and/or remove debris from all 360 degrees of the lens. The baffle may be any suitable size, shape or configuration. The baffle is configured to diffuse and redirect incoming high pressure air to the front of the tube before the air makes its way around the baffle to clear the rear of the tube.

In certain embodiments, the airflow device may include an inlet in communication with a supply of air. The baffle may be disposed about the inlet of the tube such that the air from the supply of air is provided from the inlet all the way around the tube or to the distal end of the tube, depending on the configuration of the tube, to produce a jet of air out of the outlet orifice that maintains suitable pressure and velocity over the entire 360 degree of the lens of the sensor.

The supply of air may be a compressed supply of air from an air compressor, blower, or the like. In a preferred embodiment, the compressor may comprise a conical screw compressor. Any suitable compressor or blower may be used. In some instances, the airflow device may be in communication with a wash system. For example, the wash system may include a liquid fluid and/or a detergent in line with the airflow device. In this manner, the wash system may provide a liquid and detergent into the airflow, which may be sprayed against the lens of the sensor via the outlet orifice of the tube. The combination of the pressurized air, water, and detergent may clean the lens of any hard to remove debris or buildup. In some instances, the wash system may be omitted.

In a preferred embodiment, the sensor may include a mast, a first LiDAR unit, and a second LiDAR unit. The first LiDAR unit may be attached to the mast above the second LiDAR unit. The first LiDAR unit may include a first lens, and the second LiDAR unit may include a second lens. A first air tube may be disposed around a bottom portion of the first LIDAR unit. The first air tube may include a first outlet orifice directed towards the first lens. The first outlet orifice may direct air vertically up the first lens surface. In this manner, the first outlet orifice is configured to provide an airflow vertically upward about the first lens to prevent debris accumulation about the first lens and/or remove debris from the first lens. Similarly, a second tube may be disposed around a top portion of the second LiDAR unit. The second tube may include a second outlet orifice directed towards the second lens. The second outlet orifice may direct air vertically down the second lens surface. In this manner, the second outlet orifice is configured to provide an airflow vertically downward about the second lens to prevent debris accumulation about the second lens and/or remove debris from the second lens.

In some instances, the first tube comprises an angled top surface configured to correspond to a first FOV of the first LiDAR unit, and the second tube comprises an angled bottom surface configured to correspond to a second FOV of the second LiDAR unit.

In the preferred embodiment, the first LIDAR unit, the first tube, and the first outlet orifice are substantially circular. Similarly, the second LIDAR unit, the second tube, and the second outlet orifice are substantially circular. In this manner, the first outlet orifice may extend substantially 360 degrees around the first lens of the first LiDAR unit, and the second outlet orifice may extend substantially 360 degrees around the second lens of the second LiDAR unit, which may ensure that the first and second lenses of the first and second LiDAR units are capable of being cleaned 360 degrees around.

The first tube may include a first inlet in communication with a supply of air, and the second tube may include a second inlet in communication with the supply of air and/or a different supply of air. The supply of air may be a compressed supply of air from an air compressor, blower, or the like. In some instances, the first and second tubes may be in communication with a wash system. For example, the wash system may include a liquid fluid and/or a detergent in line with the first and/or second tubes. In this manner, the wash system may provide a liquid and detergent into the first and/or second tubes, which may be sprayed against the lens of the first and second sensors via the first and second outlet orifices of the first and second tubes. The wash system may be configured to provide the liquid and detergent to each tube individually or at the same time. The combination of the pressurized air, water, and detergent may clean the first and second lens of any hard to remove debris or buildup.

The first tube may include a first baffle therein configured to distribute the airflow within the first tube to ensure sufficient pressure and velocity of the airflow exiting the first outlet orifice to prevent debris accumulation about the first lens and/or remove debris from the first lens. The first baffle may be disposed about the first inlet of the first tube such that the air from the supply of air is provided all the way around the first tube to produce a jet of air out of the first outlet orifice that maintains suitable pressure and velocity over the entire 360 degree of the first lens of the first LiDAR sensor. Similarly, the second tube may include a baffle therein configured to distribute the airflow within the second tube to ensure sufficient pressure and velocity of the airflow exiting the second outlet orifice to prevent debris accumulation about the second lens and/or remove debris from the second lens. The second baffle may be disposed about the second inlet of the second tube such that the air from the supply of air is provided all the way to the distal end of the second tube to produce a jet of air out of the second outlet orifice that maintains suitable pressure and velocity over the entire 360 degree of the second lens of the second LiDAR sensor.

These and other embodiments of the disclosure will be described in more detail through reference to the accompanying drawings in the detailed description that follows.

Illustrative Embodiments

FIG. 1 schematically depict a system 100 for controlling an airflow device 102 (e.g., an "airblade") for cleaning a sensor 104 of a vehicle 106 in accordance with an embodiment of the disclosure. The system 100 may include a controller 108. The controller 108 may include memory and one or more processors. The controller 108 may be configured or programmed to control the system and/or one or more subsystems of the system 100. In some instances, the controller 108 may be integrated into the control systems of the vehicle 106. In other instances, the controller 108 may operate independent of the vehicle control systems. Examples of subsystems that may be controlled by the controller 108 may include one or more systems for controlling the airflow device 102, the sensor 104, the air tank 110, the compressor 112, the various valves, and/or the wash system (e.g., the detergent reservoir 114 and the water reservoir 116).

The airflow device 102 is are configured to prevent or substantially reduce debris accumulation and/or remove all or some of the debris about the lens of the sensor 104 of the vehicle 106. In a preferred embodiment, the sensor 104 may include one or more LiDAR units disposed about the vehicle 106. The systems and methods disclosed herein, however, are not limited to LiDAR units. That is, any suitable sensor for navigation may be used herein. For example, the sensor 104 may include a number of sensors configured or programmed to generate signals that help navigate the vehicle 106 while the vehicle 106 is operating in one of the autonomous modes. Examples of autonomous driving sensors may include a RADAR sensor configured for detection and localization of objects using radio waves, a LiDAR sensor, a vision sensor system having trajectory, obstacle detection, object classification, augmented reality, and/or other capabilities, and/or the like. The autonomous driving sensors may help the vehicle 106 "see" the roadway and the vehicle surroundings and/or negotiate various obstacles while the vehicle 106 is operating in the autonomous modes. In this manner, the sensor 104 may comprise one or more RADAR sensors, LiDAR sensors, sonar sensors, audio sensors, and/or video sensors. Any suitable combination of sensors may be used herein.

In certain embodiments, the sensor 104 may be disposed on top of the vehicle 106. For example, a LiDAR unit may be disposed on top of the vehicle 106 as part a "tiara" structure. In some instances, the sensor 104 may include an external 360 degree lens. The lens may be static. The lens may be any suitable size, shape, or configuration. The lens may be configured to, among other things, protect the internal components of the sensor 104 while still providing signal visibility to the surroundings. The internal components of the sensor 104 may be static or dynamic (e.g., rotate). If the lens of the sensor 104 is obstructed, it may have a detrimental effect on the operation and reliability of the sensor 104. Thus, it is beneficial to prevent/reduce debris accumulation and/or remove debris about the lens of the sensor 104 of the vehicle 106.

The airflow device 102 may be configured to provide an airflow about the lens of the sensor 104. The airflow device 102 may be any suitable size, shape, or configuration. The airflow device 102 may be configured to provide a flow of air that forms an "airblade" about the lens of the sensor 104. In some instances, the airflow provided to the lens of the sensor 104 may be a constant flow of air about the lens at a low pressure and/or bursts of air about the lens at a higher pressure relative to the low pressure. In this manner, the constant flow of air may prevent/reduce accumulation of debris about the lens of the sensor 104, while the higher pressure bursts of air may remove debris about the lens of the sensor 104.

In certain embodiments, the airflow device 102 may include an inlet 118 in communication with a supply of air. In some instances, the supply of air may be supplied from the air tank 110. For example, a valve 120 may be disposed in line between the airflow device 102 and the air tank 110 to control the flow of air to the airflow device 102. The valve 120 may be any suitable valve (e.g., a solenoid valve or the like). The air tank 110 may include a compressed supply of air therein which is supplied from the compressor 112. In some instances, the air tank 110 may be omitted and the compressor 112 may supply air directly to the airflow device 102. In a preferred embodiment, the compressor may comprise a conical screw compressor. Any suitable compressor or blower may be used.

In some instances, the airflow device 102 may be in communication with a wash system, which may include the detergent reservoir 114 and the water reservoir 116. For example, the wash system may include a liquid fluid (such as water) and/or a detergent in line with the airflow device 102. In this manner, the wash system may provide the liquid from the water reservoir 116 and detergent from the detergent reservoir 114 into the airflow, which may be sprayed against the lens of the sensor 104. Although described as a water reservoir, any suitable liquid may be stored therein. Similarly, although described as a detergent reservoir, any suitable chemical may be stored therein. The combination of the pressurized air, water, and detergent may clean the lens of any hard to remove debris or buildup. The water and/or detergent may be supplied to the airflow device 102 simultaneously or independent of one another. For example, a valve 122 may be disposed in line between the airflow device 102 and the detergent reservoir 114 to control the flow of detergent to the airflow device 102. The valve 122 may be any suitable valve (e.g., a solenoid valve or the like). Similarly, a valve 124 may be disposed in line between the airflow device 102 and the water reservoir 116 to control the flow of water to the airflow device 102. The valve 124 may be any suitable valve (e.g., a solenoid valve or the like).

FIGS. 2-6 schematically depict the airflow device 102 attached to the sensor 104 in accordance with an embodiment of the disclosure. The sensor 104 may include a mast 200, a first LiDAR unit 202, and a second LiDAR unit 204. The first LiDAR unit 202 may be attached to the mast 200 above the second LiDAR unit 204. The mast 200 may include a vertical portion 206 extending from a base 208. The mast 200 may also include a horizontal portion 210 extending from the vertical portion 206. The horizontal portion 210 may be disposed between and separate the first LiDAR unit 202 and the second LiDAR unit 204. The mast 200 may by any suitable size, shape, or configuration. In some instances, the first LiDAR unit 202 or the second LiDAR unit 204 may be omitted. That is, the systems and methods disclosed herein may be equally applicable to a single sensor setup or a sensor setup that includes more than two sensors.

Figure 4:
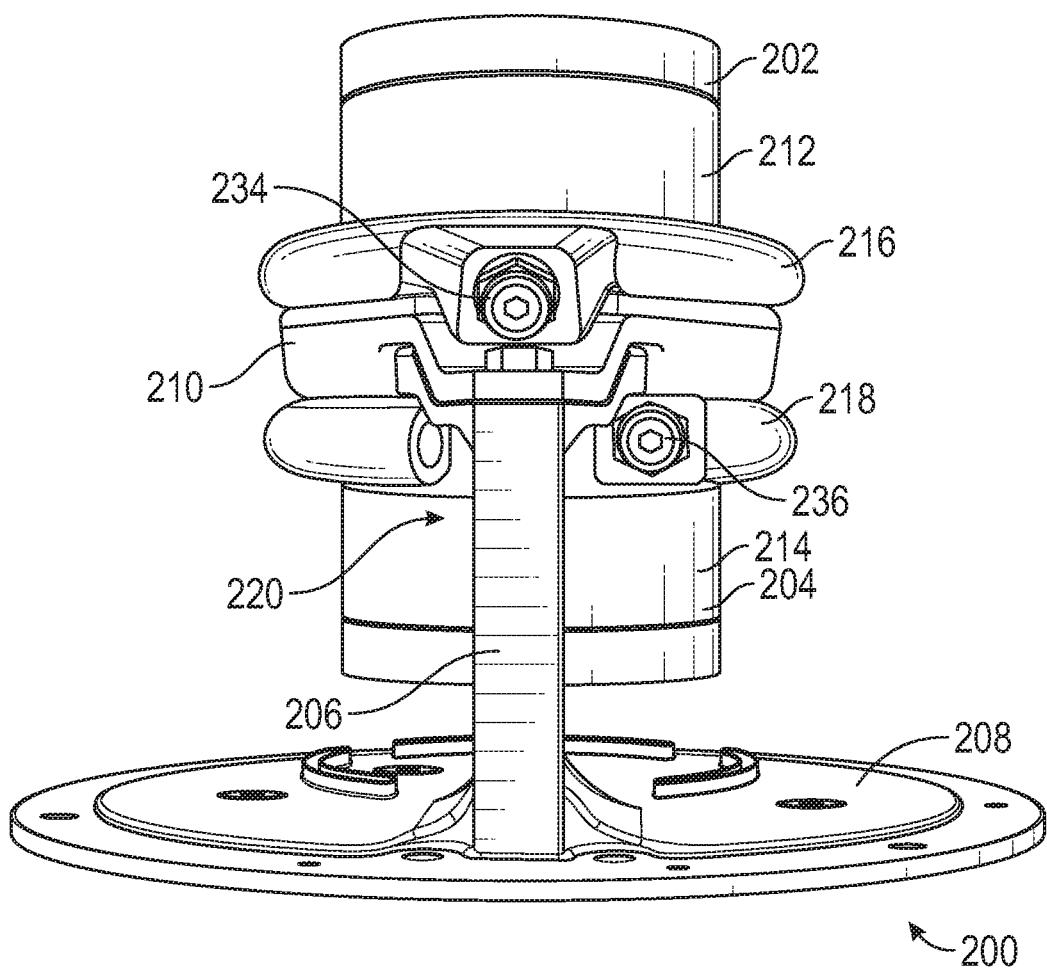
FIG. 4 schematically depicts a rear view of an airflow device in accordance with one or more embodiments of the disclosure.

The first LiDAR unit 202 may include a first lens 212, and the second LiDAR unit 204 may include a second lens 214. The airflow device 102 may include a first tube 216 disposed around a bottom portion of the first LIDAR unit 202. Similarly, airflow device 102 may include a second tube 218 disposed around a top portion of the second LiDAR unit 204. As depicted in FIG. 4, the first tube 216 extends 360 degrees around the first LiDAR unit 202, and the second tube 218 extends substantially 360 degrees around the second LiDAR unit 204 except for the gap 220 to accommodate the vertical portion 206 of the mast 200.

Figure 5:
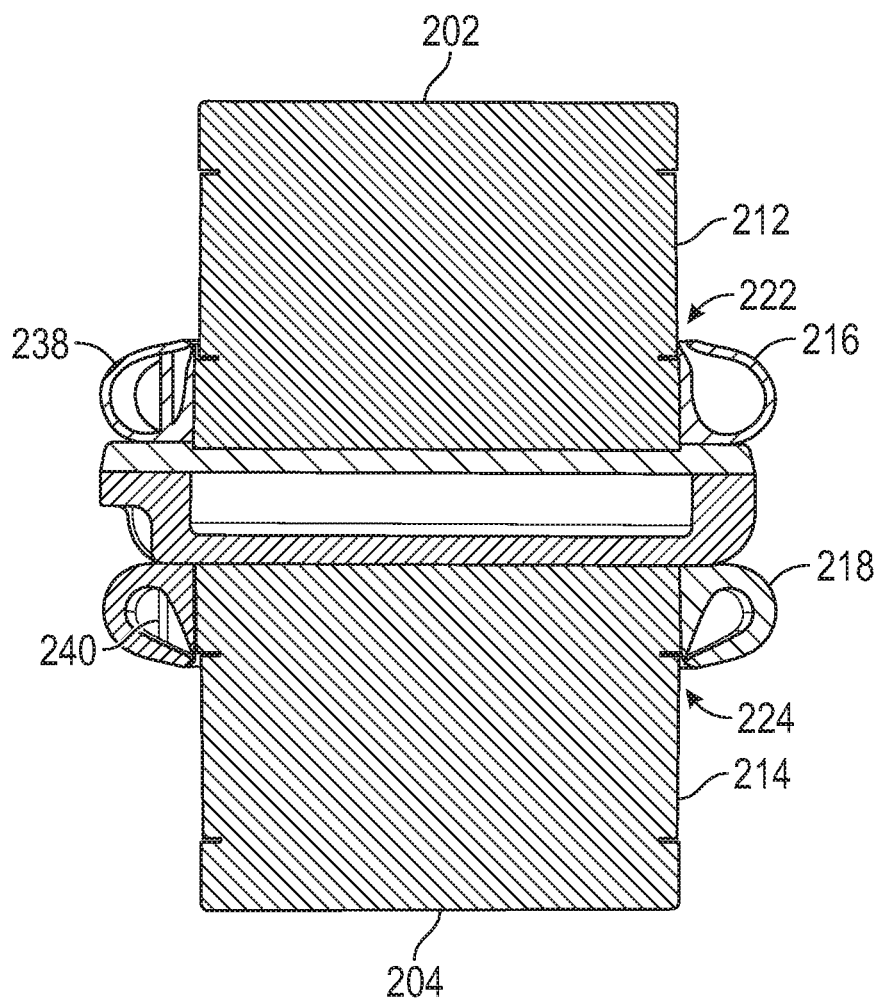
FIG. 5 schematically depicts a cross-sectional view of an airflow device in accordance with one or more embodiments of the disclosure.
Figure 6:
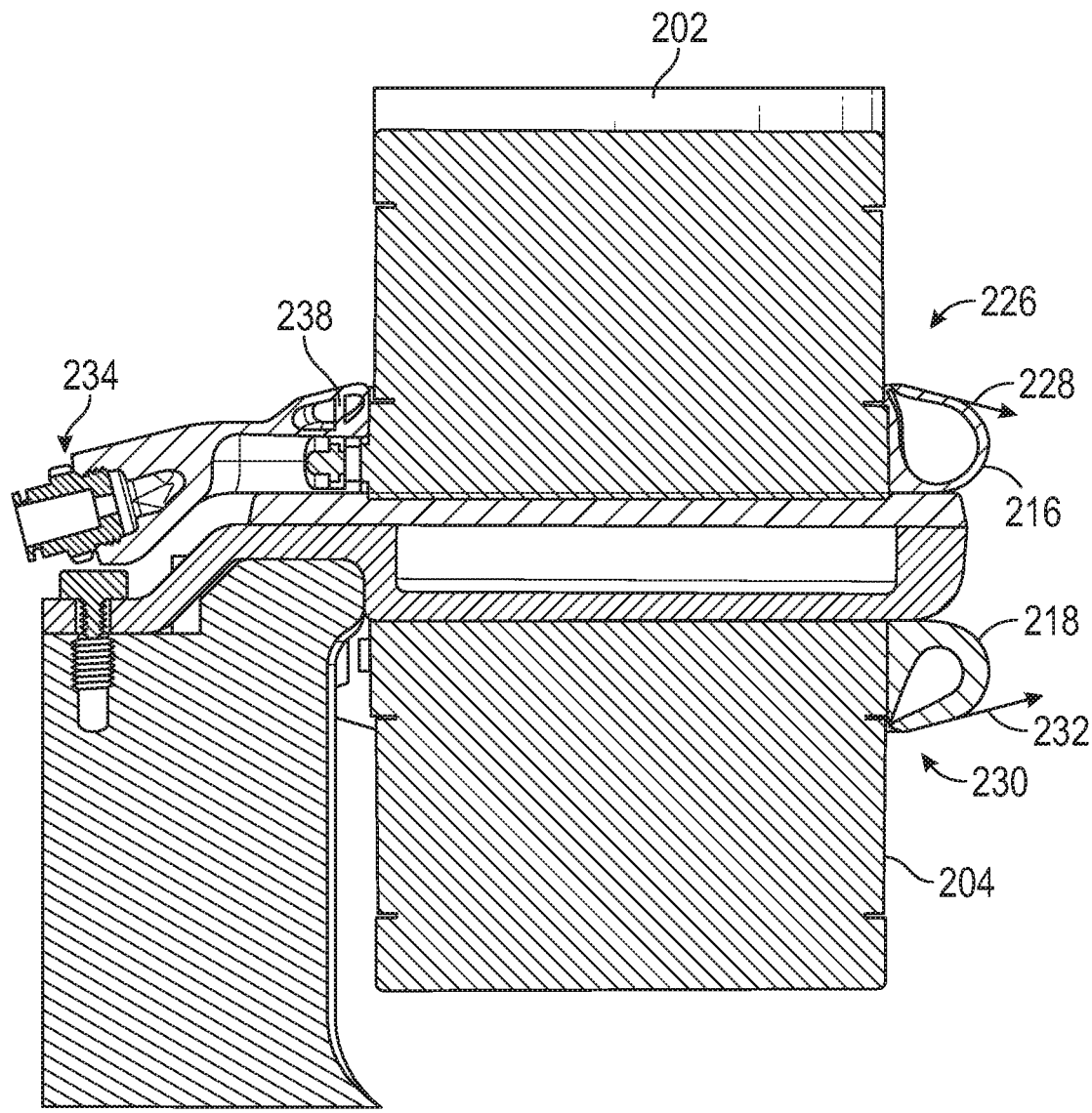
FIG. 6 schematically depicts a cross-sectional view of an airflow device in accordance with one or more embodiments of the disclosure.
Figure 7:
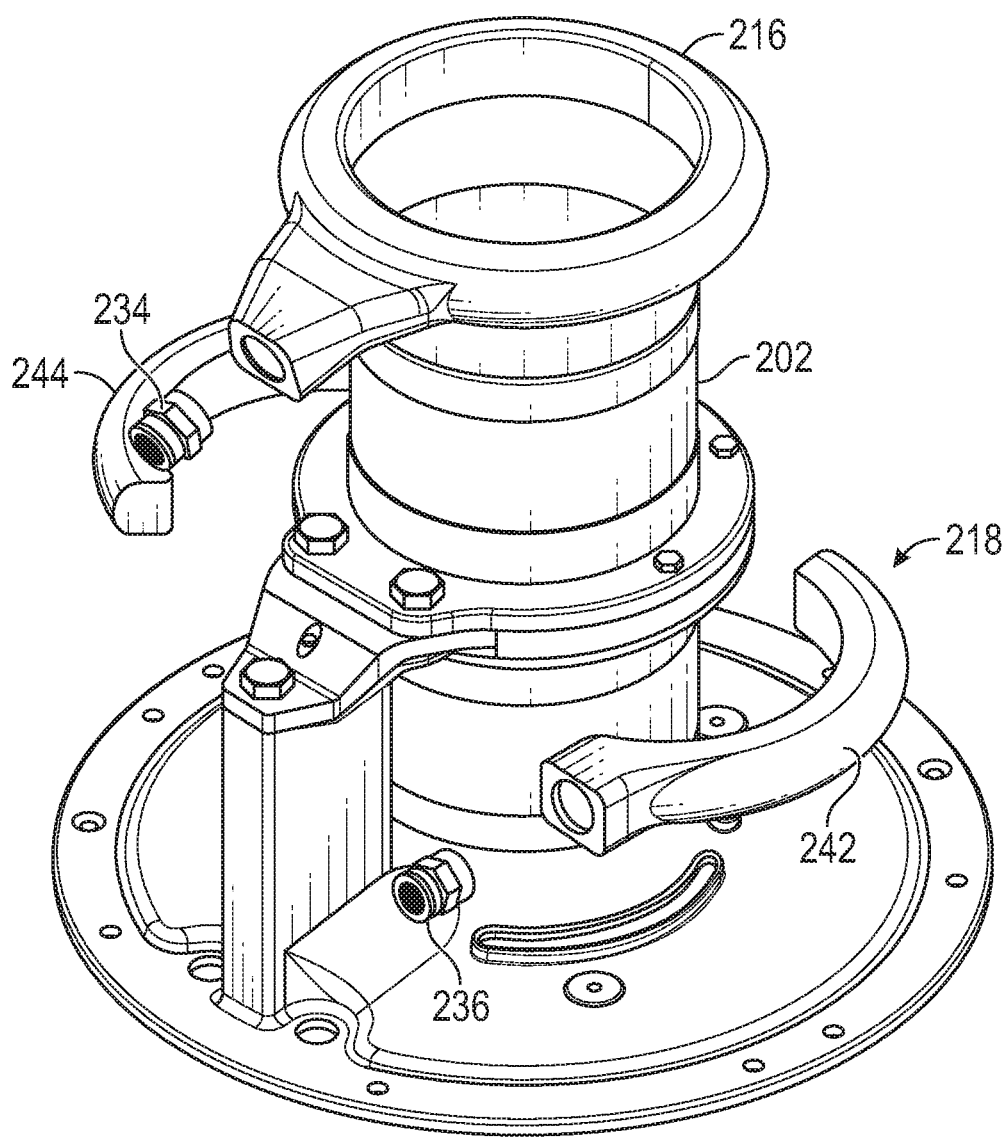
FIG. 7 schematically depicts an exploded view of an airflow device in accordance with one or more embodiments of the disclosure.
Figure 8:
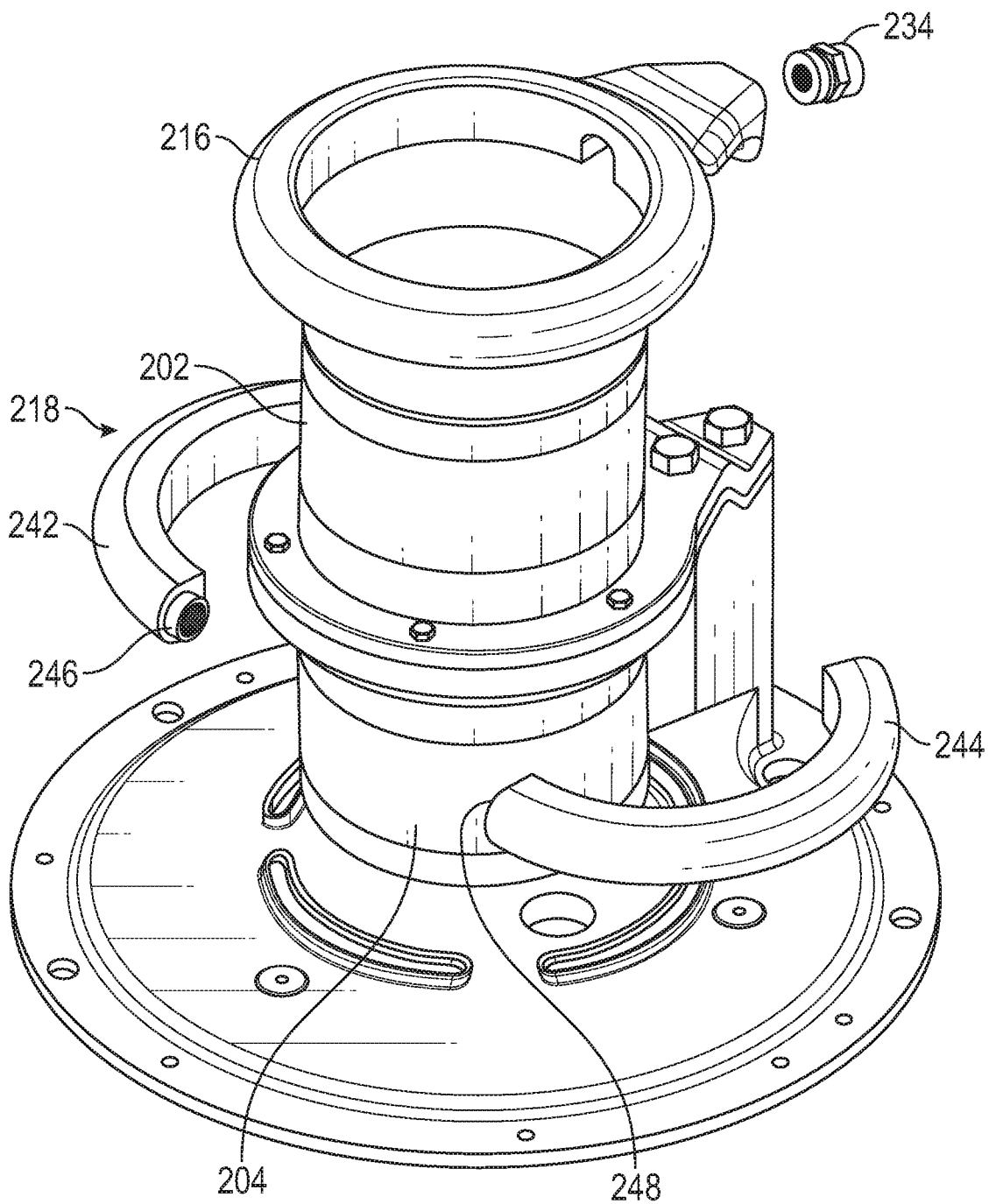
FIG. 8 schematically depicts an exploded view of an airflow device in accordance with one or more embodiments of the disclosure.
Figure 9A:
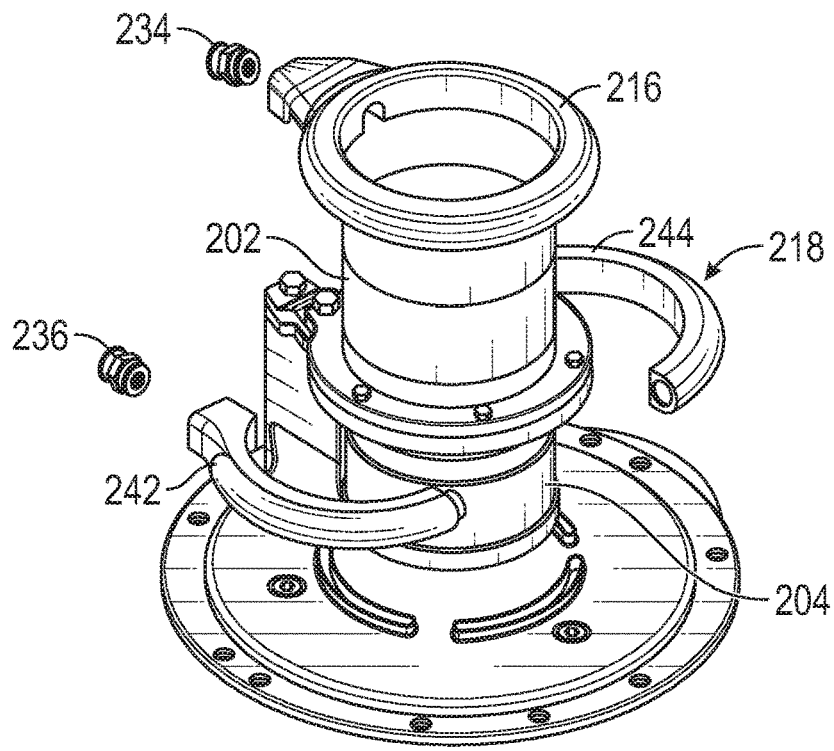
FIG. 9A schematically depicts an exploded view of an airflow device in accordance with one or more embodiments of the disclosure.
Figure 9B:
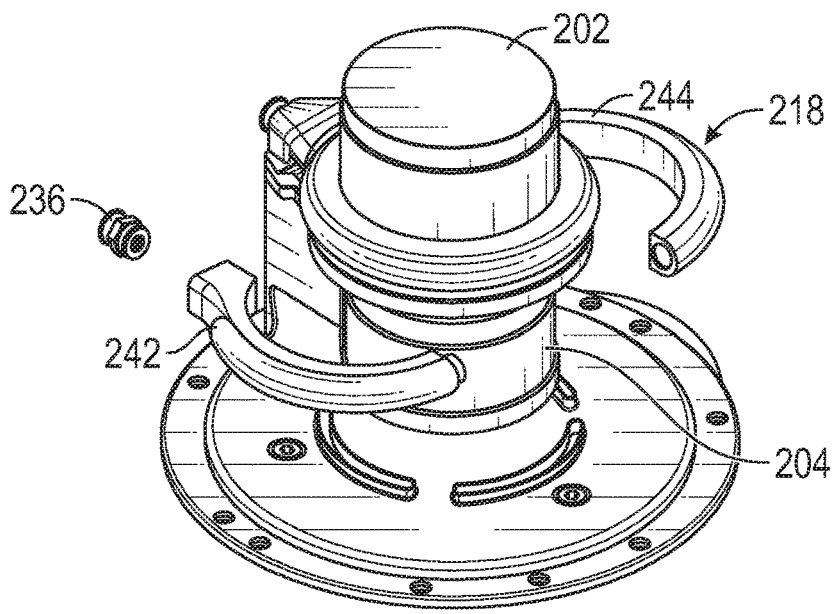
FIG. 9B schematically depicts an exploded view of an airflow device in accordance with one or more embodiments of the disclosure.
Figure 9C:
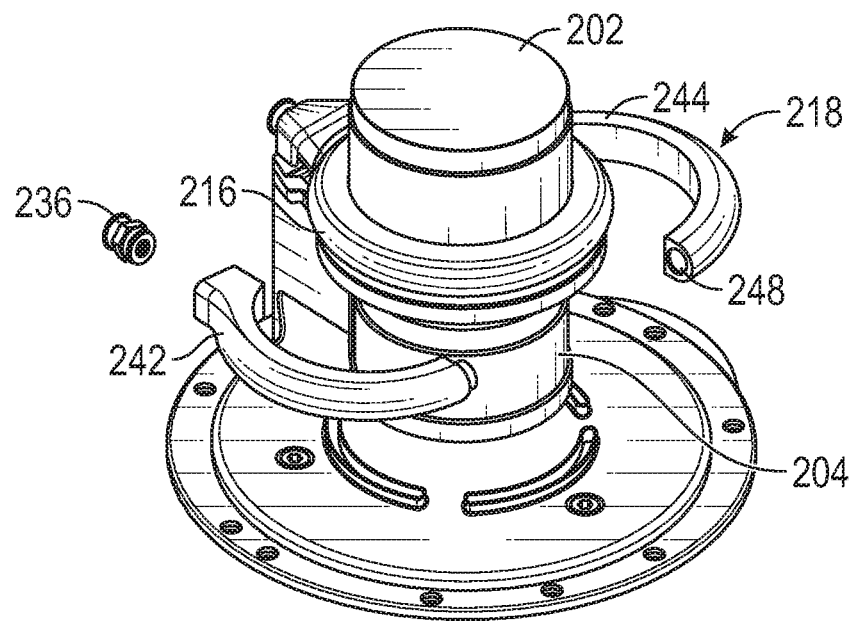
FIG. 9C schematically depicts an exploded view of an airflow device in accordance with one or more embodiments of the disclosure.
Figure 9D:
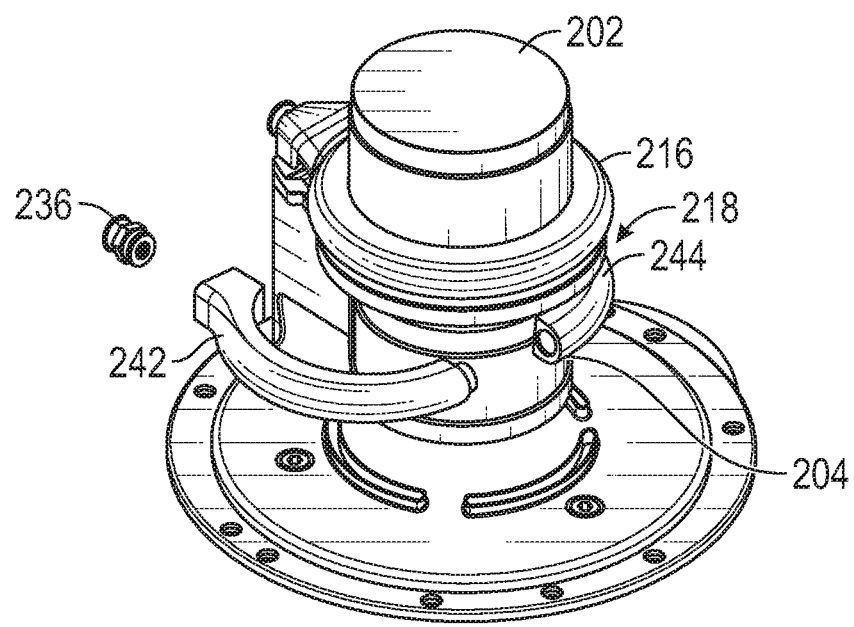
FIG. 9D schematically depicts an exploded view of an airflow device in accordance with one or more embodiments of the disclosure.
Figure 9E:
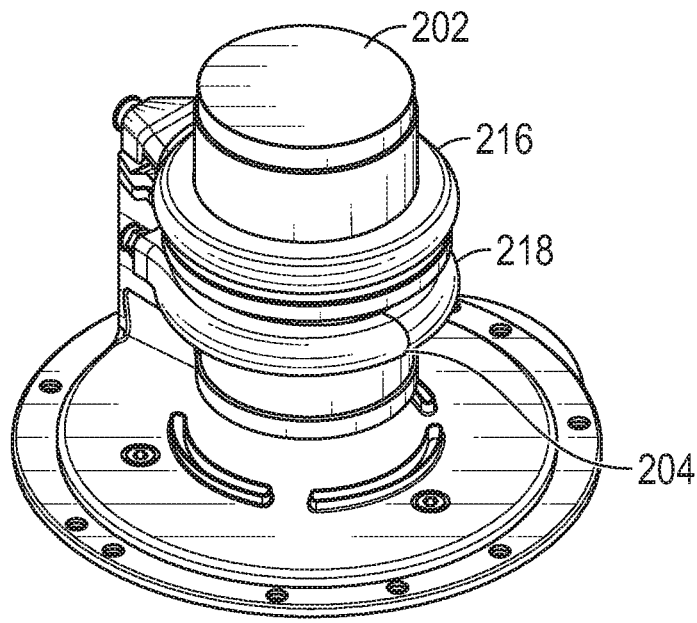
FIG. 9E schematically depicts an upper view of an airflow device in accordance with one or more embodiments of the disclosure.

As depicted in FIGS. 5 and 6, the first tube 216 may include a first outlet orifice 222 directed towards the first lens 212. The first outlet orifice may direct air vertically up the surface of first lens 212. In this manner, the first outlet orifice 222 is configured to provide an airflow vertically upward about the first lens 212 to prevent debris accumulation about the first lens 212 and/or remove debris from the first lens 212. The first outlet orifice 222 may be any suitable size, shape, or configuration to create an "airblade" around the 360 degree diameter and entire vertical length of the first lens 212. The second tube 218 may include a second outlet orifice 224 directed towards the second lens 214. The second outlet orifice 224 may direct air vertically down the surface of the second lens 214. In this manner, the second outlet orifice 224 is configured to provide an airflow vertically downward about the second lens 214 to prevent debris accumulation about the second lens 214 and/or remove debris from the second lens 214. The second outlet orifice 224 may be any suitable size, shape, or configuration to create an "airblade" around the 360 degree diameter (excluding the gap 220) and entire vertical length of the second lens 214.

In some instances, as depicted in FIG. 6, the first tube 216 comprises an angled top surface 226 configured to correspond to a first FOV 228 of the first LiDAR unit 202. In this manner, the angled top surface 226 may ensure that the shape of the first tube 216 does not interfere with the first FOV 228 of the first LiDAR unit 202. Similarly, the second tube 218 comprises an angled bottom surface 230 configured to correspond to a second FOV 232 of the second LiDAR unit 204. In this manner, the angled bottom surface 230 may ensure that the shape of the second tube 218 does not interfere with the second FOV 232 of the second LiDAR unit 204.

The first LIDAR unit 202, the first tube 216, and the first outlet orifice 222 are substantially circular. Similarly, the second LIDAR unit 204, the second tube 218, and the second outlet orifice 224 are substantially circular. In this manner, the first outlet orifice 222 may extend substantially 360 degrees around the first lens 212 of the first LiDAR unit 202, and the second outlet orifice 224 may extend substantially 360 degrees around (excluding the gap 220) the second lens 214 of the second LiDAR unit 204, which may ensure that the first lens 212 and the second lens 214 are capable of being cleaned 360 degrees around along their entire vertical lengths.

Referring back to FIG. 4, the first tube 216 may include a first inlet 234 configured to be in communication with a supply of air, and the second tube 218 may include a second inlet 236 configured to be in communication with the supply of air and/or a different supply of air. The first inlet 234 and the second inlet 236 may include attachments (e.g., quick connects, threaded attachments, etc.) for attaching a supply line (e.g., a hose or the like) from the supply of air. The supply of air may be a compressed supply of air from an air tank, an air compressor, blower, or the like. In some instances, the first tube 216 and the second tube 218 may be in communication with a wash system as described above with reference to FIG. 1. For example, the wash system may include a liquid fluid and/or a detergent in line with the first tube 216 and/or the second tube 218. In this manner, the wash system may provide a liquid and detergent into the first tube 216 and/or the second tube 218, which may be sprayed against the first lens 212 of the first LiDAR unit 202 and the second lens 214 of the second LiDAR unit 204 via the first outlet orifice 222 and the second outlet orifice 224, respectively. The wash system may be configured to provide the liquid and detergent to each tube individually or at the same time. The combination of the pressurized air, water, and detergent may clean the first lens 212 and the second lens 214 of any hard to remove debris or buildup.

Referring back to FIGS. 5 and 6, the first tube 216 may include a first baffle 238 therein. The first baffle 238 may be configured to distribute the airflow within the first tube 216 to ensure sufficient pressure and velocity of the airflow exiting the first outlet orifice 222 to prevent debris accumulation about the first lens 212 and/or remove debris from the first lens 212. Without the first baffle 238, air entering the first inlet 234 may exit the first outlet orifice 222 near the first inlet 234 without making it to the diametrically opposed end of the first tube 216 away from the first inlet 234. Thus, the first baffle 238 ensures there is sufficient pressure and velocity exiting the first outlet orifice 222 all the way around the first tube 216. That is, the first baffle 238 may be disposed about the first inlet 234 of the first tube 216 such that the air from the supply of air is provided all the way around the first tube 216 to produce a jet of air out of the first outlet orifice 222 that maintains suitable pressure and velocity over the entire 360 degree of the first lens 212 of the first LiDAR unit 202. The first baffle 238 may extend in both direction within the first tube 216 away from the first inlet 234. In some instances, the first baffle 238 may extend at least partially (e.g., 30%) within and around the diameter of the first tube 216. Similarly, the second tube 218 may include a second baffle 240 therein. The second baffle 240 may be configured to distribute the airflow within the second tube 218 to ensure sufficient pressure and velocity of the airflow exiting the second outlet orifice 224 to prevent debris accumulation about the second lens 214 and/or remove debris from the second lens 214. Without the second baffle 240, air entering the second inlet 236 may exit the second outlet orifice 224 near the second inlet 236 without making it to the distal end of the second tube 218. Thus, the second baffle 240 ensures there is sufficient pressure and velocity exiting the second outlet orifice 224 all the way around the second tube 218. That is, the second baffle 240 may be disposed about the second inlet 236 of the second tube 218 such that the air from the supply of air is provided all the way around the second tube 218 to produce a jet of air out of the second outlet orifice 224 that maintains suitable pressure and velocity over the entire 360 degree of the second lens 214 of the second LiDAR unit 204. The second baffle 240 may extend within the second tube 218 away from the second inlet 236. In some instances, the second baffle 240 may extend at least partially (e.g., 30%) within and around the diameter of the second tube 218.

In certain embodiments, as depicted in FIGS. 7-9E, the first tube 216 may be a unitary tube that is slid over the first LiDAR unit 202. The second tube 218 may comprises multiple segments configured to be attached together around the second LiDAR unit 204. For example, the second tube 218 may comprise a first segment 242 and a second segment 244. The first segment 242 and the second segment 244 may be attached together around the second LiDAR unit 204. The multiple segment configuration of the second tube 218 enables the second tube 218 to be positioned around the second LiDAR unit 204 without interference from the mast 200. Although shown as two segments, the second tube 218 may be divided into additional segments. The second tube 218 may be any suitable number of segments. The first segment 242 and the second segment 244 may be press fit. For example, the first segment 242 may include a male attachment 246, and the second segment 244 may include a corresponding female attachment 248.

FIGS. 9A to 9E sequentially depict the airflow device being assembled about the first LiDAR unit 202 and the second LiDAR unit 204. In one example embodiment, the first tube 216 and/or the second tube 218 are configured to be attached to the first LiDAR unit 202 and the second LiDAR unit 204, respectively, or the mast 200 via one or more fasteners. The first tube 216 and/or the second tube 218 may be attached by any suitable means, including welded, glued, and/or fastened with a fastener (e.g., a screw, rivet, magnet, etc.). In a preferred embodiment, the first tube 216 and/or the second tube 218 may include one or more magnets disposed thereabout that are configured to mate with a corresponding magnet or magnetic surface of the first LiDAR unit 202 and the second LiDAR unit 204, respectively, or the mast 200.

Illustrative Methods

Figure 10:
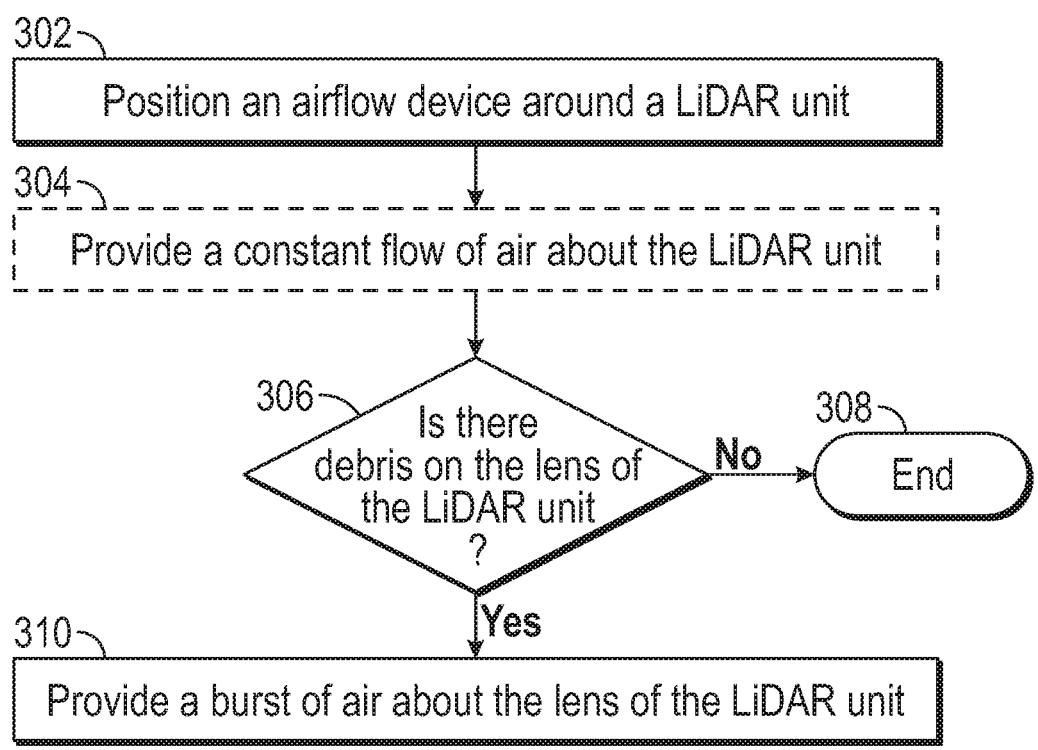
FIG. 10 depicts a flow diagram in accordance with one or more embodiments of the disclosure.

FIG. 10 is a flow diagram depicting an illustrative method 300 for preventing or substantially reducing debris accumulation and/or removing all or some of the debris about the lens of a sensor of a vehicle in accordance with one or more embodiments of the disclosure.

At block 302 of method 300, an airflow device is positioned around a LiDAR unit. The airflow device may include a tube disposed around the LiDAR unit. The tube may be any suitable size, shape, or configuration. The tube may include an angled surface configured to substantially correspond to a field of view (FOV) of the LiDAR unit. The angled surface may be a top and/or bottom surface of the tube depending on the location of the tube relative to the lens of the LiDAR unit. In this manner, the angled surface may ensure that the tube does not interfere with the FOV of the LiDAR unit.

In certain embodiments, the tube comprises an outlet orifice directed towards the lens of the LiDAR unit. The LiDAR unit, the tube, and the outlet orifice may be substantially circular. In this manner, the airflow device uses the substantially circular outlet orifice to produce a jet of air that maintains pressure and velocity over the entire 360 degree of the lens of the LiDAR unit without losing effectiveness due to boundary layer separation. In some instances, the airflow device is able to be incorporated onto the lens of the LiDAR unit without modification to the lens or the LiDAR unit as a whole and is able to clean all 360 degrees of the lens of the LiDAR unit.

Once the airflow device is positioned in place around the LiDAR unit in step 302, the airflow device may be configured to provide a constant flow of air about the lens of the LiDAR unit at step 304. The constant flow of air may be controlled via the controller 108. The constant flow of air may be at a relatively low pressure. The constant flow of air may prevent/reduce accumulation of debris about the lens of the LiDAR unit. In some instances, the step 304 of providing a constant flow of air may be omitted.

At step 306 of the method 300, it may be determined if there is debris on the lens on of the LiDAR unit. In some instances, such a determination may be made by the controller 108, which may be in communication with one or more sensors associated with the LiDAR unit that are configured to monitor the surface of the lens of the LiDAR unit. That is, one or more sensors may be used to detect the presence of an obstruction (such as debris) on the lens of the LiDAR unit. In other instances, it may be determined that debris is on the lens on of the LiDAR unit if the sensing capabilities of the LiDAR unit are determined to be compromised by the controller 108. For example, the signal strength of the LiDAR unit may be below a threshold, which may indicate the presence of an obstruction (such as debris) on the lens of the LiDAR unit.

At step 310 of the method 300, if it is determined that there is an obstruction (such as debris) on the lens of the LiDAR unit, the airflow device may be configured to provide bursts of air about the lens of the LiDAR unit at a relatively high pressure. For example, the controller 108 may instruct the airflow device to provide one or more bursts of air about the lens of the LiDAR unit. In this manner, the higher pressure bursts of air may remove the debris about the lens of the LiDAR unit. If it is determined by the controller 108 that there is no debris on the lens of the LiDAR unit, then the method 300 may end at step 308.

In some instances, the airflow device may be in communication with a wash system, which may include a liquid fluid and/or a detergent in line with the airflow device. In this manner, the controller 108 may control the operation of one or more of the valves 120, 122, and 124 in order to provide a liquid and detergent into the airflow, which may be sprayed against the lens of the sensor via the outlet orifice of the tube as part of the bursts of air. The combination of the pressurized air, water, and detergent may clean the lens of any hard to remove debris or buildup. After the water and/or detergent are sprayed onto the lens, the controller 108 may provide instructions for an additional burst of air only to remove any residual water or determined on the lens.

Figure 11:
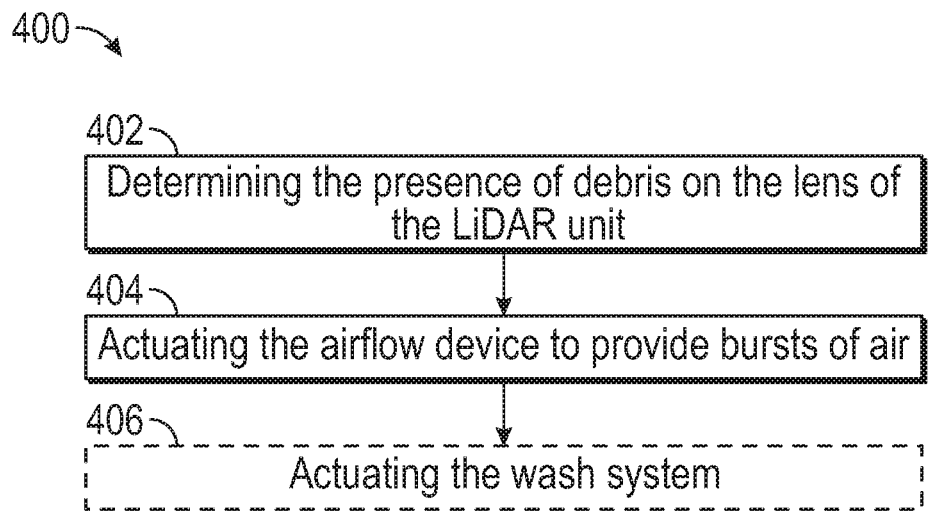
FIG. 11 depicts a flow diagram in accordance with one or more embodiments of the disclosure.

FIG. 11 is a flow diagram depicting an illustrative method 400 implements by the controller 108 (or other computing device or combination of computing devices local to the vehicle and/or over a network via the "cloud") for preventing or substantially reducing debris accumulation and/or removing all or some of the debris about the lens of a sensor of a vehicle in accordance with one or more embodiments of the disclosure. At block 402, the methods may include determining, by the controller 108, the presence of debris about the lens of the LiDAR unit. For example, one or more sensors may be used to detect the presence of an obstruction (such as debris) on the lens of the LiDAR unit. In other instances, it may be determined that debris is on the lens on of the LiDAR unit if the sensing capabilities of the LiDAR unit are determined to be compromised by the controller 108. For example, the signal strength of the LiDAR unit may be below a threshold, which may indicate the presence of an obstruction (such as debris) on the lens of the LiDAR unit.

Once it is determined that debris is disposed about the lens of the LiDAR unit, the controller 108 may cause the airflow device to be actuated at block 404. For example, the airflow device may be configured to provide bursts of air about the lens of the LiDAR unit at a relatively high pressure. For example, the controller 108 may instruct the airflow device to provide one or more bursts of air about the lens of the LiDAR unit. In this manner, the higher pressure bursts of air may remove the debris about the lens of the LiDAR unit.

In some instances, the wash system may also be actuated at block 406. For example, the controller 108 may control the operation of one or more of the valves 120, 122, and 124 in order to provide a liquid and detergent into the airflow, which may be sprayed against the lens of the sensor via the outlet orifice of the tube as part of the bursts of air.

Figure 12:
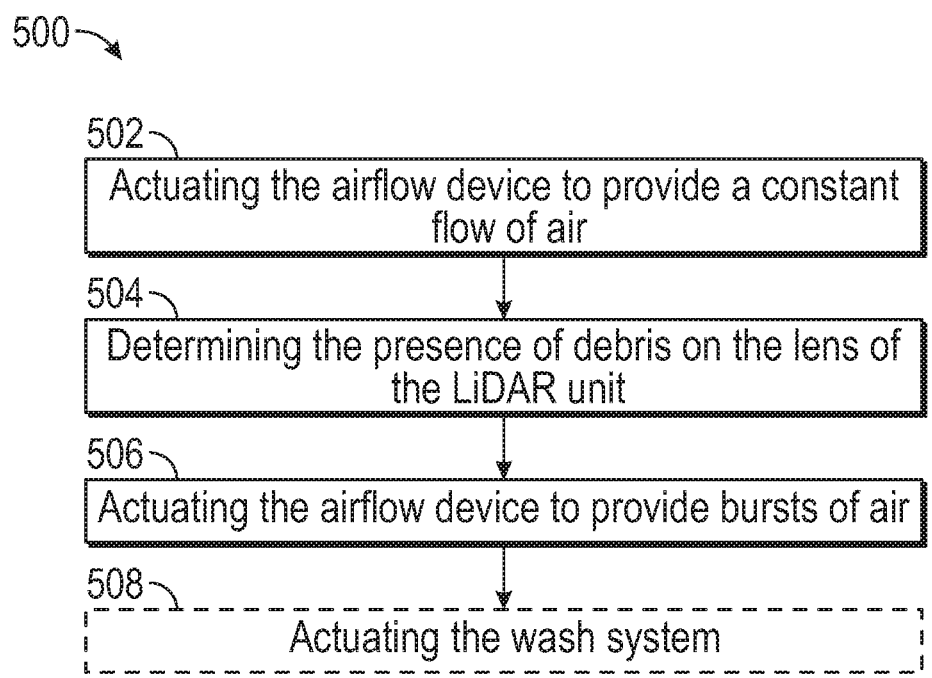
FIG. 12 depicts a flow diagram in accordance with one or more embodiments of the disclosure.

FIG. 12 is a flow diagram depicting an illustrative method 500 implements by the controller 108 (or other computing device or combination of computing devices local to the vehicle and/or over a network via the "cloud") for preventing or substantially reducing debris accumulation and/or removing all or some of the debris about the lens of a sensor of a vehicle in accordance with one or more embodiments of the disclosure. At block 502, the methods may include activating, by the controller, the airflow device to provide a constant flow of air about the lens of the LiDAR. The constant flow of air may be at a relatively low pressure. The constant flow of air may prevent/reduce accumulation of debris about the lens of the LiDAR unit.

At block 504 the method may include determining, by the controller 108, the presence of debris about the lens of the LiDAR unit. For example, one or more sensors may be used to detect the presence of an obstruction (such as debris) on the lens of the LiDAR unit. In other instances, it may be determined that debris is on the lens on of the LiDAR unit if the sensing capabilities of the LiDAR unit are determined to be compromised by the controller 108. For example, the signal strength of the LiDAR unit may be below a threshold, which may indicate the presence of an obstruction (such as debris) on the lens of the LiDAR unit.

Once it is determined that debris is disposed about the lens of the LiDAR unit, the controller 108 may cause the airflow device to be actuated at block 506. For example, the airflow device may be configured to provide bursts of air about the lens of the LiDAR unit at a relatively high pressure. For example, the controller 108 may instruct the airflow device to provide one or more bursts of air about the lens of the LiDAR unit. In this manner, the higher pressure bursts of air may remove the debris about the lens of the LiDAR unit.

In some instances, the wash system may also be actuated at block 508. For example, the controller 108 may control the operation of one or more of the valves 120, 122, and 124 in order to provide a liquid and detergent into the airflow, which may be sprayed against the lens of the sensor via the outlet orifice of the tube as part of the bursts of air.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, while embodiments of the disclosure have been described with respect to specific configurations, numerous other configurations are within the scope of this disclosure. Still further, while embodiments of the disclosure have been described with respect to specific types or configurations of systems and devices, numerous other types and configurations are within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

That which is claimed is:

1. A system, comprising:
    a sensor comprising a lens;
    an airflow device disposed around the lens, wherein the airflow device comprises an outlet orifice directed at the lens that is configured to provide an airflow around the lens to prevent debris accumulation around the lens and/or remove debris from the lens; and
    a wash system configured to direct water through the outlet orifice,
    wherein the airflow device includes a tube disposed around the sensor and having a central opening,
    wherein the sensor extends through and directly contacts an inner surface of the central opening of the tube,
    wherein the tube has a baffle extending across a cross section of the tube to distribute the airflow within the tube to ensure sufficient pressure and velocity of the airflow exiting the outlet orifice and to prevent debris accumulation about the lens and/or remove debris from the lens,
  wherein the baffle divides an interior of the tube into two chambers, and
  wherein the outlet orifice is in one of the two chambers.

2. The system of claim 1, wherein the tube comprises an angled surface configured to correspond to a field of view of the sensor.

3. The system of claim 1, wherein the tube comprises multiple segments configured to be attached together around the sensor, and
  wherein the tube is configured to be attached to the sensor via one or more fasteners.

4. The system of claim 1, wherein the sensor, the tube, and the outlet orifice are substantially circular, and
  wherein the tube extends about 360 degrees around the sensor such that the outlet orifice extends about 360 degrees around the lens.

5. The system of claim 1, wherein the sensor comprises a lidar unit.

6. The system of claim 1, wherein the airflow device comprises an inlet in communication with a supply of air.

7. The system of claim 1, wherein the airflow device is configured to provide (i) a constant flow of air about the lens and/or (ii) bursts of air about the lens.

8. The system of claim 1, wherein the sensor comprises a first lidar unit and a second lidar unit,
  wherein the tube comprises a first tube disposed around the first lidar unit and a second tube disposed around the second lidar unit,
  wherein the first tube comprises an angled top surface configured to correspond to a field of view of the first lidar unit, and
  wherein the second tube comprises an angled bottom surface configured to correspond to a field of view of the second lidar unit.

9. A system comprising:
  a first lidar unit having a first lens,
  a second lidar unit having a second lens;
  a first tube with a first outlet orifice directed towards the first lens;
  a second tube with a second outlet orifice directed towards the second lens; and
  a wash system configured to direct water through the first outlet orifice and the second outlet orifice,
  wherein the first tube has a central opening and the first lidar unit extends through and directly contacts the central opening,
  wherein the first tube has a first baffle extending across a cross section of the first tube to distribute an airflow within the first tube to ensure sufficient pressure and velocity of the airflow exiting the first outlet orifice to prevent debris accumulation about the first lens and/or remove debris from the first lens,
  wherein the first baffle divides an interior of the first tube into two chambers, and
  wherein the first outlet orifice is in one of the two chambers.

10. A system, comprising:
  a sensor comprising a lens;
  a tube disposed around the lens, the tube defining an outlet orifice directed at the lens, the tube having a baffle extending across a cross section of the tube to distribute the airflow within the tube to ensure sufficient pressure and velocity of the airflow exiting the outlet orifice to prevent debris accumulation about the lens and/or remove debris from the lens,
  wherein the baffle divides an interior of the tube into two chambers, and
  wherein the outlet orifice is in one of the two chambers.

11. The system of claim 10, wherein the tube is a ring, and
  wherein the baffle extends at least 30% around a diameter of the tube.

12. The system of claim 9, further comprising:
  a mast;
  wherein the first lidar unit and the second lidar unit are attached to the mast.

13. The system of claim 12, wherein the first tube comprises an angled top surface configured to correspond to a field of view of the first lidar unit, and
  wherein the second tube comprises an angled bottom surface configured to correspond to a field of view of the second lidar unit.

14. The system of claim 12, wherein the first lidar unit, the first tube, and the first outlet orifice are substantially circular, and
  wherein the second lidar unit, the second tube, and the second outlet orifice are substantially circular.

15. The system of claim 12,
  wherein the second tube comprises a second baffle therein configured to distribute the airflow within the second tube to ensure sufficient pressure and velocity of the airflow exiting the second outlet orifice to prevent debris accumulation about the second lens and/or remove debris from the second lens.

16. The system of claim 12, wherein the first tube comprises a first inlet in communication with a supply of air, and wherein the second tube comprises a second inlet in communication with the supply of air and/or a different supply of air.

17. The system of claim 1, wherein the airflow device is a ring, and
  wherein the outlet orifice extends about an entire circumference of the ring.

18. The system of claim 10, wherein the baffle has a first end connected to an inner surface of the tube and a second end connected to the inner surface of the tube.

* * * * *